United States Patent [19]

Schwab

[11] 4,378,874
[45] Apr. 5, 1983

[54] PALLET ELEVATOR FOR A SHIP
[75] Inventor: Randall J. Schwab, Portland, Oreg.
[73] Assignee: Transco Northwest, Inc., Portland, Oreg.
[21] Appl. No.: 247,168
[22] Filed: Mar. 24, 1981
[51] Int. Cl.³ ............................................. B65G 17/16
[52] U.S. Cl. ..................................... 198/802; 198/406
[58] Field of Search ....................... 198/800, 802, 706; 414/140

[56] References Cited

U.S. PATENT DOCUMENTS

| 633,118 | 9/1899 | Case | 198/706 |
|---|---|---|---|
| 1,765,118 | 6/1930 | Abriani | 198/802 |
| 3,365,052 | 1/1968 | Kornylak | 198/802 |
| 3,409,118 | 11/1968 | Meyer | 198/706 |
| 3,664,482 | 5/1972 | Kornylak | 198/800 |
| 3,854,570 | 12/1974 | Kornylak | 198/800 |
| 4,130,196 | 12/1978 | Schwab | 198/802 |

Primary Examiner—Joseph E. Valenza
Assistant Examiner—Dennis Williamson
Attorney, Agent, or Firm—Klarquist, Sparkman, Campbell, Leigh, Whinston & Dellett

[57] ABSTRACT

A pallet elevator for a ship includes symmetrical carrier trays and symmetrical followers, each follower being pivotally mounted at its center on a tray-carrying chain. A pair of follower rollers are symmetrically mounted on each follower, one roller of the pair being mounted at each end thereof. The center line of each carrier tray is coincident with the center of each of its respective followers and the center plane of the tray is perpendicular to a line joining the centers of the follower rollers. The follower rollers are guided by a guide track which comprises a single race adjacent the load-carrying flight of the chain and a pair of parallel races adjacent the return flight of the chain. The track further comprises a pair of outer cam tracks for guiding the rollers adjacent the sprockets around which the chains pass. The outer cam tracks merge the single race and the parallel races along generally arcuate paths. When the follower rollers are guided in the single race they are positioned substantially vertically one above the other. The carrier tray is then in a horizontal position. When the follower rollers are guided in the pair of parallel races, on the return flight of the chain, their centers are positioned substantially horizontally and the carrier tray is in a generally vertical position. The outer cam tracks guide the follower rollers by means of slots following arcuate paths which slots rotate each carrier tray ninety degrees as its followers are guided from the single race adjacent the load-carrying flight of the chain to the parallel races adjacent the return flight of the chain and vice versa.

9 Claims, 10 Drawing Figures

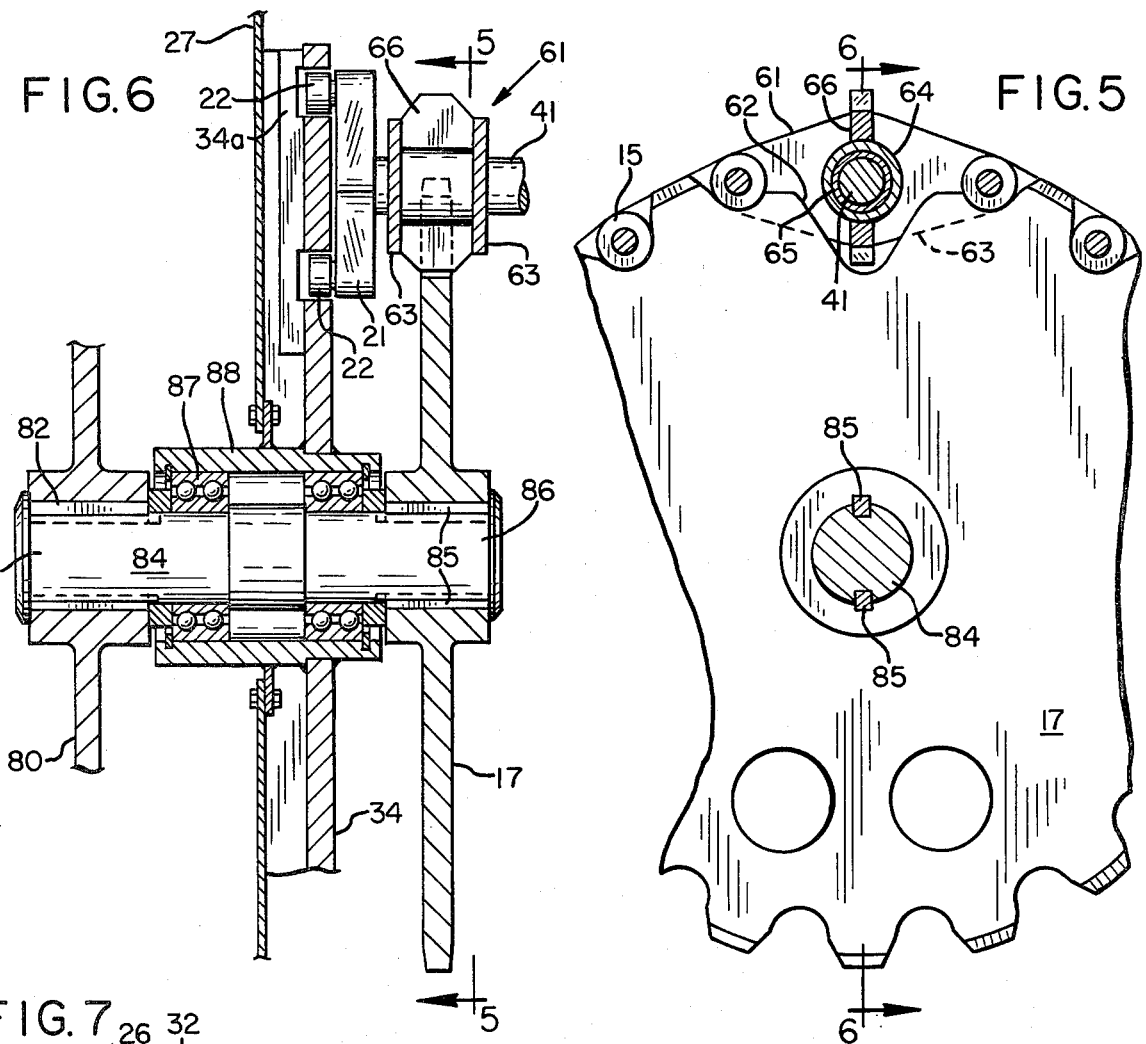
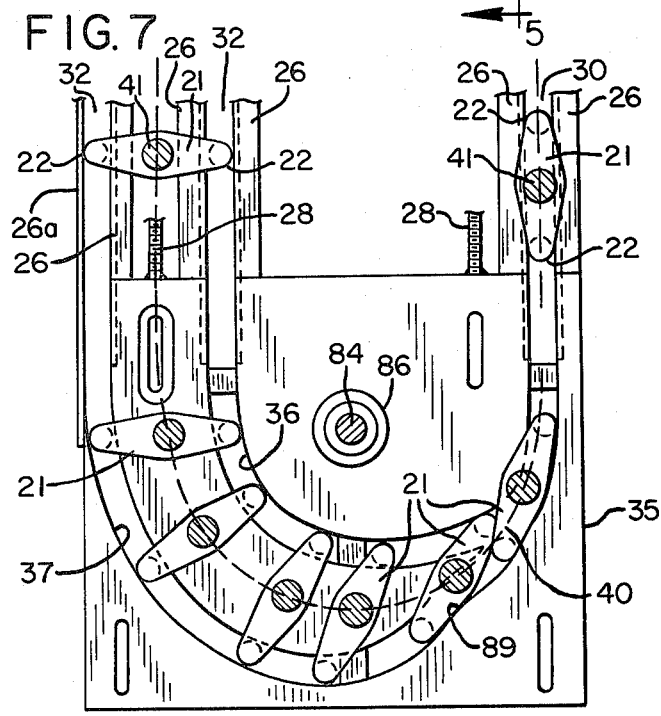

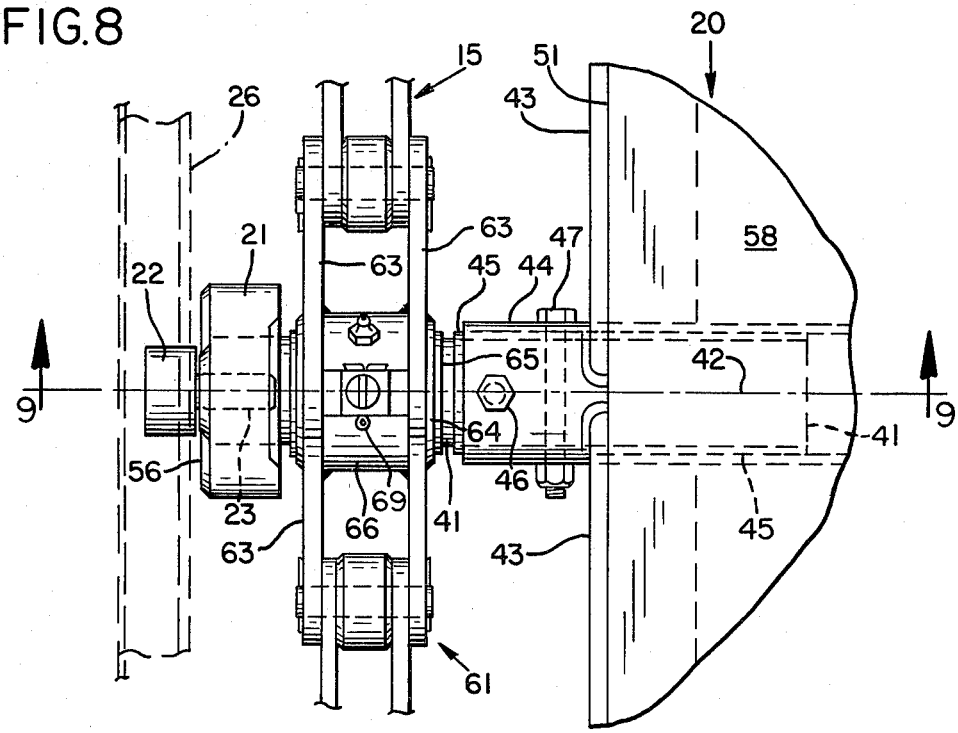
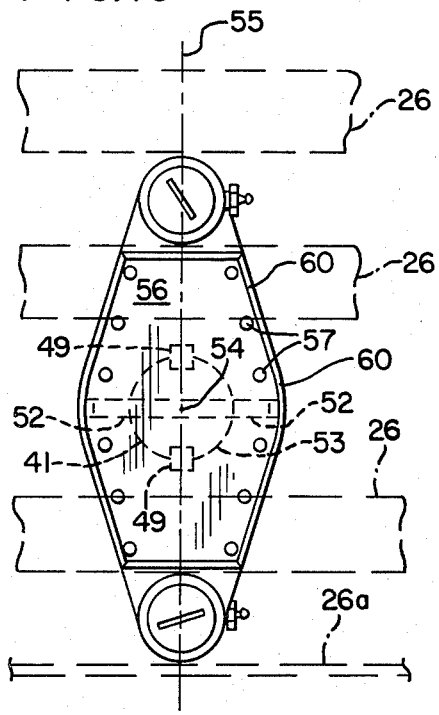
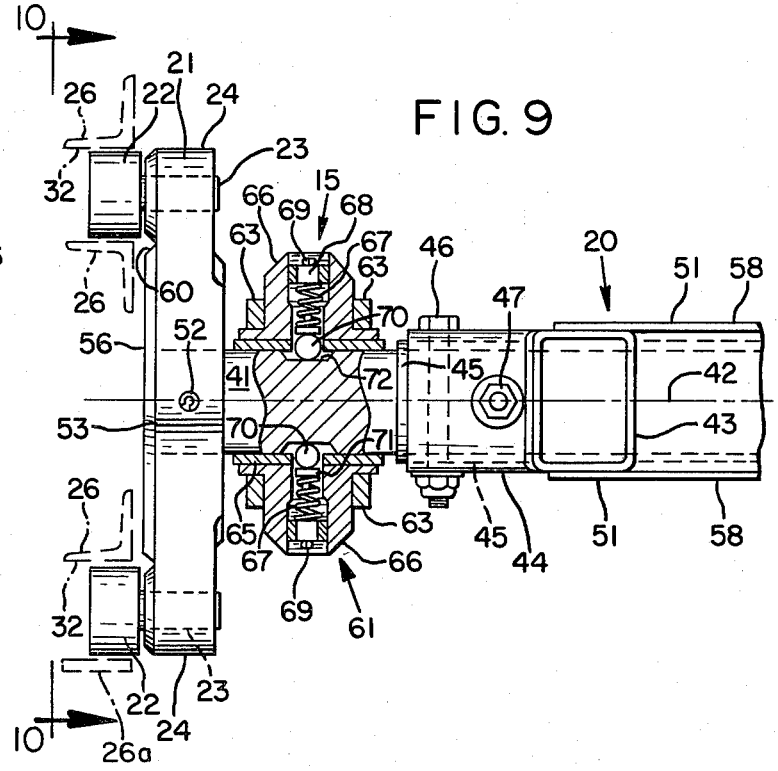

PALLET ELEVATOR FOR A SHIP

BACKGROUND OF THE INVENTION

This invention relates to an improved elevator suitable for handling heavy loads aboard ship and more particularly, to an elevator capable of handling pallet loads weighing up to three thousand pounds.

In my U.S. Pat. No. 4,130,196, I disclosed a package elevator for a ship wherein slotted or tined trays are carried by pairs of forked followers pivotally attached to a pair of chains driven in parallel endless paths by upper driving sprockets and around lower idler sprockets. The elevator is suitable for transporting packages weighing about one hundred eight-five pounds each. The followers have arms on which are mounted follower rollers which project into inner and outer endless guide tracks. The rollers guide the trays so that they lie along the chains when in a return course, but project outwardly therefrom when in a load-carrying mode. The guide tracks include cam blocks adjacent the sprockets which turn the follower arms and trays only ninety degrees relative to the chains as the trays travel around the sprockets.

It is an object of the present invention to provide an elevator for a ship which is suitable for heavier loads than can be accommodated by the elevator disclosed in my aforementioned U.S. Pat. No. 4,130,196.

It is a further object of the present invention to provide an elevator of the aforementioned type which requires a minimum amount of space in which to rotate the trays.

It is a still further object of the present invention to provide an elevator of the aforementioned type wherein the followers and the trays are both symmetrical, such that symmetrical loading on the trays can be achieved, whereby the entire loading is carried axially by the chains and none of the direct loading is carried by the followers or their rollers.

It is a still further object of the present invention to provide an elevator of the aforementioned type which requires only one guide track for the follower rollers on the load-carrying side.

It is a still further object of the present invention to provide an elevator of the aforementioned type wherein the guide tracks for the follower rollers do not cross each other.

It is a still further object of the present invention to provide an elevator of the aforementioned type wherein the cam tracks adjacent the sprockets are substantially identical at both the upper and lower ends.

It is a still further object of the present invention to provide an elevator of the type described which is simpler and more economical to construct than elevators heretofore known.

SUMMARY OF THE INVENTION

In contradistinction to prior designs my improved elevator utilizes symmetrical carrier trays and symmetrical followers. Each follower is pivotally mounted at its center on one of the tray-carrying chains. A pair of follower rollers are symmetrically mounted on the follower, one roller of the pair being mounted at each end of the follower. The center line of each tray is coincident with the center of each of its respective followers and the center plane and loading surfaces of the tray are perpendicular to a line joining the centers of the follower rollers.

Each guide track which guides the follower rollers comprises a single race adjacent one (the load-carrying) flight of the chain. Each track further comprises a pair of parallel races adjacent the other (the return) flight of the chain. Finally, each track comprises a pair of outer cam tracks for guiding the rollers adjacent the sprockets. The outer cam tracks merge the single race and the parallel races along generally arcuate paths.

When the follower rollers are guided in the single race of the guide track, as in a load-carrying mode, they are positioned substantially vertically one above the other. The carrier tray is then in a horizontal position. A symmetrically placed load is thus carried axially and substantially entirely by the chains. None of the load is carried by the followers or by the follower rollers. When the follower rollers are guided in the pair of parallel races, that is, adjacent the return flight of the chain, their centers are positioned substantially horizontally. The carrier tray is thus in a generally vertical position, its center plane being generally coincident with the plane of the chains.

The outer cam tracks guide the follower rollers as they pass from the single race to the parallel races of the endless guide track and vice versa. The outer cam tracks preferably comprise slots in generally similar upper and lower cam plates, the slots following arcuate paths which rotate each carrier tray ninety degrees as the followers are guided from the single race adjacent the load-carrying flight of the chain to the parallel races adjacent the return flight of the chain and vice versa.

Preferably, the mounting of each symmetrical follower on the tray-carrying chains is achieved by a cylindrical horizontally disposed shaft, the follower being mounted at its center on one end thereof. The carrier tray is mounted on the shaft along its center line on the other end thereof. The shaft is journaled in a specially constructed link of the chain. Preferably, such link comprises a bushing to receive the shaft, the shaft being journaled in the bushing in the link intermediate the follower and the carrier tray.

The elevator preferably includes means to prevent the carrier tray from rotating about its center line when it is in its generally vertical, return flight position. Such means prevent the tray from contacting and interfering with the elevator shaft walls. One exemplary means comprise a pair of detents disposed within the carrying link of the chain, one each of the detents being disposed on each side of the center line of the tray-carrying shaft. The means further comprise spring means urging the pair of detents toward the center line of the shaft. The shaft includes notches on opposed sides thereof in the region of the pair of detents, the notches being adapted to receive the detents when the carrier tray is in its generally vertical, return flight position, the detents locking the shaft to the carrying link of the chain, thereby to prevent rotation of the shaft and the tray about their mutual center line.

The followers preferably include brake facing material on their sides adjacent the guide track. In this manner tipping of the entire elevator, as might occur aboard ship, does not cause undue wear of the followers.

BRIEF DESCRIPTION OF THE DRAWINGS

In the drawings:

FIG. 5 is an elevational view of a tray-carrying chain sprocket;

FIG. 6 is a sectional view taken on line 6—6 of FIG. 5;

FIG. 7 is a partial enlarged front elevational view of the lower end of the elevator illustrating the lower outer cam track plate and the path of a follower as it is guided from the single race to the parallel races and vice versa;

FIG. 8 is a vertical sectional view taken on line 8—8 of FIG. 4;

FIG. 9 is a horizontal sectional view taken on line 9—9 of FIG. 8; and

FIG. 10 is a vertical elevational view taken on line 10—10 of FIG. 9.

DESCRIPTION OF A PREFERRED EMBODIMENT

Figure 1:
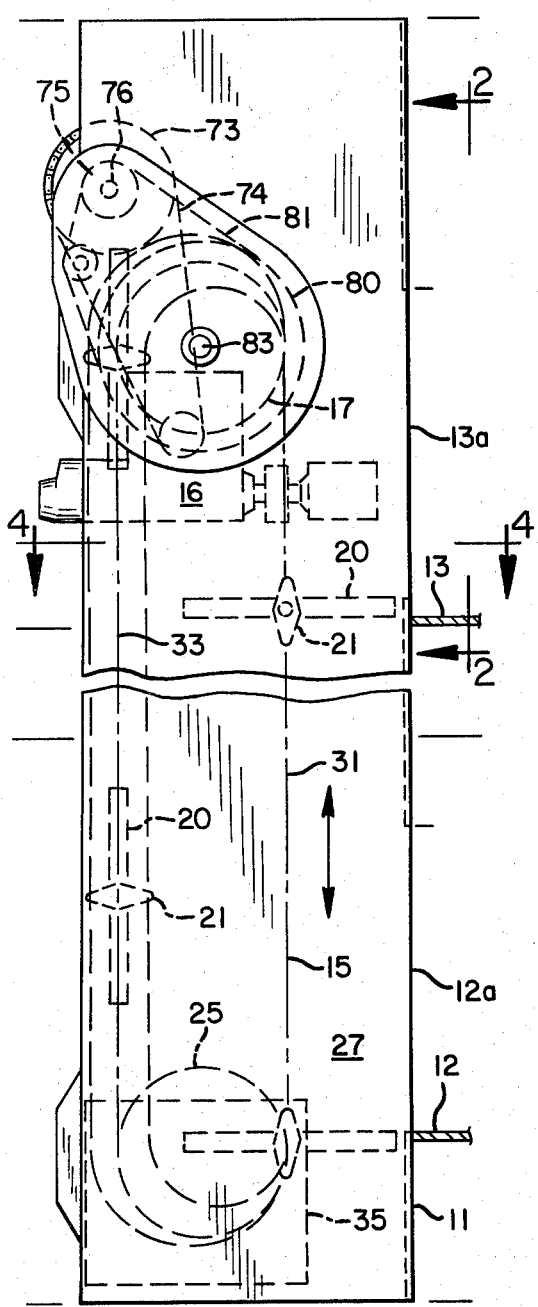
FIG. 1 is a partial front elevational view of an elevator forming one embodiment of the present invention, the view disclosing substantially the upper and lower ends of the elevator.

A ship elevator forming one specific embodiment of the invention includes a hollow vertical elevator shaft 11 installed in a ship and extending between several decks, of which only a lower deck 12 and an upper deck 13 are shown. An access opening 12a and 13a is installed in the shaft at each of the respective decks 12 and 13.

A pair of endless chains 15 are driven in clockwise and counterclockwise directions by a reversible drive 16 through drive sprockets 17. The chains 15 carry symmetrical carrier trays 20 by means of cam roller brackets or followers 21, each of which carries a pair of follower rollers 22 symmetrically journaled on roller shafts 23 at each end 24 of the follower 21. The chains 15 also travel around idler sprockets 25 journaled at the bottom of the elevator.

Figure 3:
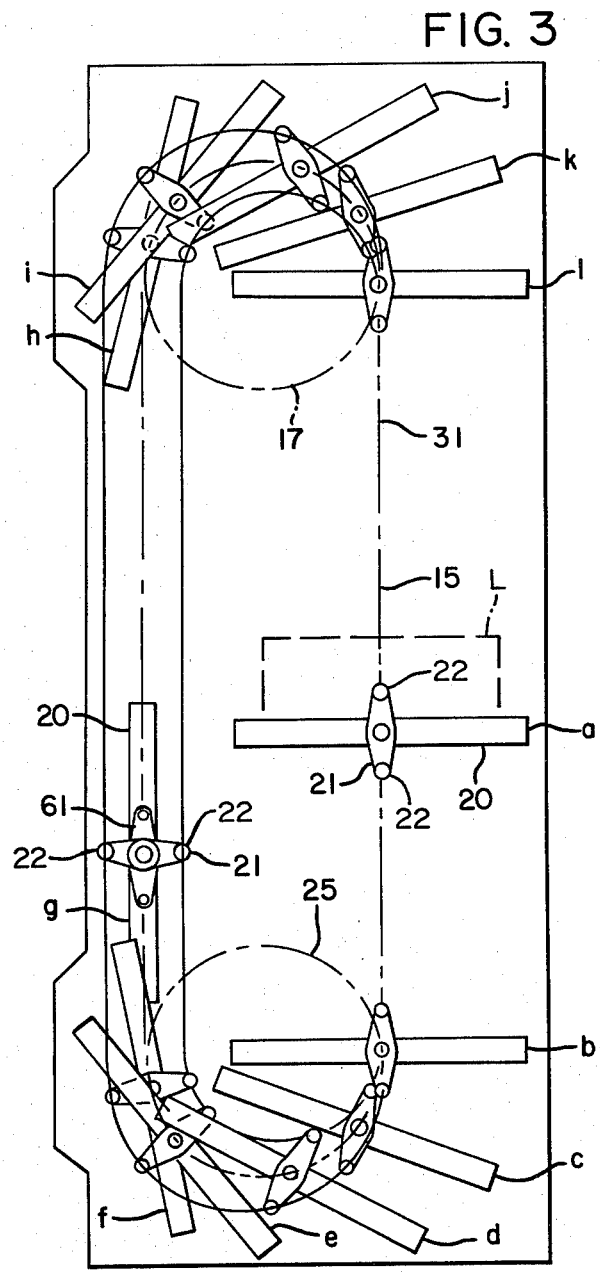
FIG. 3 is a generally schematic view of the elevator showing the path of motion of a carrier tray.
Figure 4:
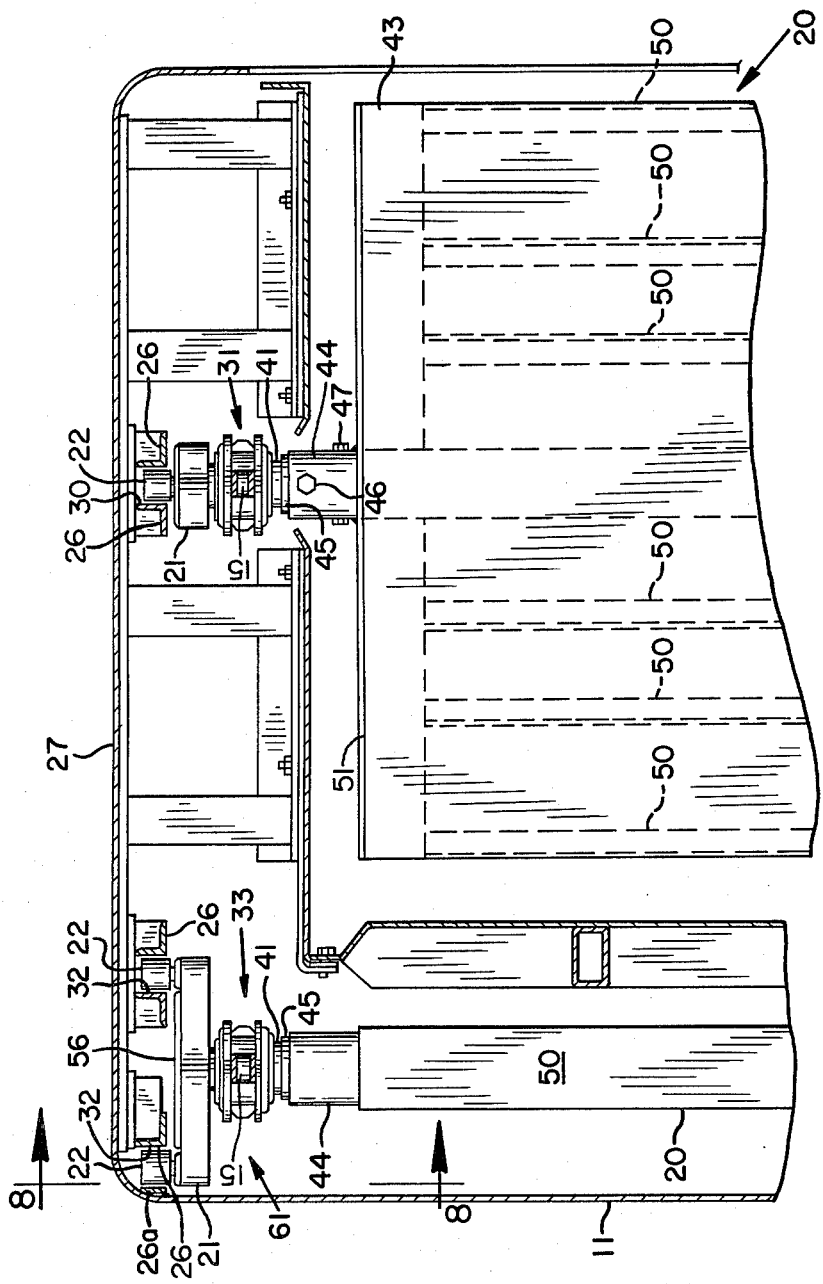
FIG. 4 is a partial horizontal sectional view taken on line 4—4 of FIG. 1.

Referring to FIGS. 1 and 4, the elevator shaft 11 is provided with guide tracks comprising vertical angle members 26 along its side walls 27. The angle members 26 form a single race 30 (see FIG. 4) adjacent each load-carrying flight 31 of the chains 15 (the right-hand flights as viewed in FIGS. 1 and 3) and (together with vertical plate member 26a) a pair of parallel races 32 adjacent each return flight 33 of the chains 15 (the left-hand flights as viewed in FIGS. 1 and 3). The rollers 22 are adapted to be guided by the races 30 and 32, as hereinafter to be described.

Positioned adjacent the sprockets 17 and 25 and adjustably supported by adjusting bolts 28 adjacent the side elevator shaft walls 27, are pairs of upper and lower cam plates 34, 35 (spliced by splice plates 34a, for example), which are slotted along arcuate paths 36, 37 effectively to merge each of the single races 30 into the parallel races 32 and vice versa. See FIGS. 1, 3 and 7. Specifically, the guide track angle members 26, which together with the plate member 26a form the parallel races 32, extend into and join the slotted paths 36, 37. The angle members 26 which form each single race 30 likewise extend into and join the confluence 40 formed by the slotted arcuate paths 36, 37.

As illustrated in FIGS. 8, 9 and 10 (these figures illustrate the follower 21, chain 15 and carrier tray 20 in the relationship they occupy as the rollers 22 travel in the parallel races 32 adjacent the return flight of the chain), each parallel tray 20 is mounted on a pair of horizontal cylindrical shafts 41 such that the center line 42 of the tray coincides with that of the shafts.

Each of the trays 20 comprises pairs of rectangular tubular headers 43 welded to a center cylindrical pipe 44 reinforced at its ends by stiffener tubes 45 to which it is welded, the pipe 44 and tubes 45 being attached to the shaft 41 by hex head bolts 46, 47, as shown. The tubes 45 extend inwardly of each pipe 44 to the ends of their respective shafts 41. The headers 43 are joined by spaced channel members 50. The headers 43 and channel members 50 are covered top and bottom by steel plates 51 which form the load bearing surfaces or loading planes 58 of the trays.

The followers 21 are double keyed, as at 49, and further secured by roll pins 52 to the shafts 41, one follower 21 being so mounted at each end 53 of each shaft 41, such that the center line 42 of the shaft and tray is coincident with the center 54 of the follower, the parts also being assembled such that the loading planes 58 of each tray 20 are perpendicular to a line 55 joining the centers of the rollers 22. Each of the followers 21 is provided with an outer layer 56 of brake facing material, the layers 56 being attached by flat head rivets 57 and being provided with beveled edges 60, as shown. In this manner, if the elevator shaft 11 is itself tilted during operation of the elevator, as might occur aboard ship, the facing material 56 will contact the track angles 26, thus to avoid injury to the followers 21.

Each of the chains 15 is provided with a special link 61 to receive and support each shaft 41 and journal the same for rotation therein. The links 61 are spaced apart a distance equal to the circumference of each of the sprockets 17 and 25. Accordingly, each of the sprockets 17 and 25 is cut out or notched as at 62 to accommodate the links 61. See FIGS. 5 and 6.

Each of the links 61 includes a pair of side plates 63 supporting a central hub 64 to which the plates 63 are welded. A bronze bushing 65, which journals each shaft 41 and permits rotation of the shaft with respect to the link, is positioned within each hub 64. A boss 66 is mounted one on each side of the hub 64, each boss receiving a compression spring 67 adjustable by a set screw 68 retained by a cotter pin 69 to exert pressure on a steel ball 70 through a nylon adaptor 71. Each shaft 41 is complementarily notched on opposed sides as at 72, the notches 72 being circular in cross-section and positioned to receive the balls 70 when a carrier tray 20 is in the generally vertical position, as when the followers 21 travel in the parallel races 32 along the return flight 33 of the chain. In this manner the balls 70, which serve as detents, lock the shaft 41 to the link 61 and prevent carrier tray rotation and interference with the elevator shaft walls as might otherwise occur due to deviation of the follower rollers 22 from a strict horizontal disposition.

Figure 2:
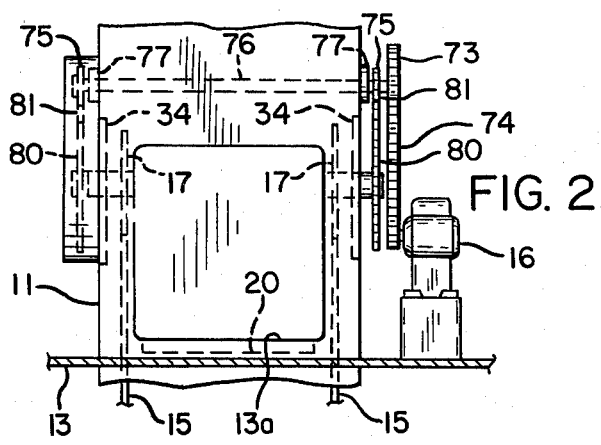
FIG. 2 is a side elevational view taken on line 2—2 of FIG. 1.

As previously mentioned, the tray carrying chains 15 are driven by a reversible drive 16 through the sprockets 17. As shown in FIGS. 1 and 2, the drive 16 transmits rotary power to a double sprocket 73 through a pair of chains 74, power thence being transmitted to two sprockets 75 mounted on a shaft 76 which rotates in bearings 77. Each of the sprockets 75 in turn drives a sprocket 80 through a chain 81.

As more clearly illustrated in FIGS. 5 and 6, each sprocket 80 is keyed as at 82 to one end 83 of a shaft 84, the sprocket 17 being double keyed as at 85 to the other end 86 thereof. Each shaft 84 is supported in twin double rows of bearings 87 whose housing 88 is in turn supported by the respective upper cam plate 34.

OPERATION

The operation of my conveyor is illustrated schematically in FIG. 3. A load L, which may be a pallet loaded with three thousand pounds of material, is placed on one of the carrier trays 20 when the latter is positioned opposite, for example, an access opening 12a and 13a located at a deck 12 or 13. The pallet load is preferably symmetrically placed on the tray 20 as shown in FIG. 3. The tray can then be raised or lowered by means of the drive 16 to an upper or lower deck for removal thereat.

When a tray 20 is in a load-carrying position, it extends horizontally, as shown in the position marked "a" in FIG. 3. The followers 21 extend generally vertically with the follower rollers 22 positioned one above the other in the single race 30. See also FIG. 7.

If the tray-carrying chains 15 then are driven clockwise, the tray 20 is lowered approximately to a position opposite the center of the lower sprocket 25, position "b" in FIG. 3. Inasmuch as the path of the chains 15 is determined by the sprocket 25, further counterclockwise movement of the chains causes the follower rollers 22 to separate into the slots 36 and 37 in the lower cam plate 35. See FIG. 7.

Specifically, the center line 42 of the tray 20 and shaft 41 follows a circular path dictated by the configuration of the sprocket 25, and such action effectively causes the rollers 22 to rotate the followers 21 and thus the shaft 41 and tray 20 as the rollers are guided by the diverging slots 36 and 37 in the plate 35. The tray and its followers thus successively achieve the positions shown as "c", "d", "e", "f", and ultimately, "g". In this latter position, the tray 20 and its shafts 41 have been rotated ninety degrees with respect to the position they occupied at "a", the follower rollers 22 being guided in the pair of parallel races 32 with their centers positioned substantially horizontally as shown.

Rotation of the shafts 41 within the links 61 causes the springs 67 to force the balls 70 into the notches 72 in the shafts 41, thereby to lock the latter to the links 61 and effectively prevent any oscillation of the trays 20 during their return flight.

Further clockwise rotation of the chains 15 causes a similar ninety degree rotation of the shafts 41 and tray 20 as indicated in the successive positions "h", "i", "j", "k", and "l" in FIG. 3. This is due to the fact that both upper and lower cam plates 34 and 35 are provided with cam tracks of substantially identical configuration.

In order to prevent binding of the rollers 22 as they pass by the confluence 40 of the single race 30 into the diverging arcuate slots 36 and 37, I have found it desirable to provide a short reversely curved section 89 in the outer slot 37. See FIG. 7.

Since the trays 20 are rotated only ninety degrees as they pass around each of the sprockets 17 and 25, an upper or load-carrying surface 58 of a tray, as in position "a", becomes a bottom surface after the tray has passed completely around both sprockets. In this manner, therefore, the trays 20 are successively loaded on both their top and bottom loading surfaces, thereby more evenly to distribute the wear on both such surfaces.

Since the rotation of the sprockets 17 and 25 determines the path of the center line of each tray 20 and its supporting shafts 41, the actual path of rotation of the tray within the links 61 is determined by the particular configuration of the slots 36 and 37 in the upper and lower cam plates 34 and 35. Variations in the paths of the slots 36 and 37, therefore, will result in varying the pattern of rotation of the tray, thereby to accommodate different bottom or top loading requirements, as for example, different access locations at top or bottom.

When the chains 15 are rotated in a counterclockwise direction, a tray transitions oppositely from that abovedescribed, for example, from position "g" successively to position "b". In this movement the tray and shaft 21 are also rotated by the action of the paths 36 and 37 in the cam plates 35. In this movement, however, a force is exerted by the cam plates, which force acts to dislodge the balls 70 from the notches 72 in the shafts 41, whereby the balls 70 then ride on the exterior surface of the shafts 41, the detent action being terminated when the tray 20 is in a horizontal load-carrying position with the rollers 22 in the single race 30. In this latter position a load carried by a tray 20 and symmetrically placed thereon, is carried entirely axially by the chains 15 on the load-carrying flight 31, none of the loading being carried by the followers 21 or their rollers 22, which serve a guide purpose only.

As can be seen from the above description, my elevator achieves numerous advantages. Among these are the fact that it achieves the transition of a carrier tray from a load-carrying position "a" to a vertically extending or return position "g" in a minimum amount of space at both the upper and lower ends of the elevator. Furthermore, a transverse impact on a loaded tray in the "a" position is transmitted to four follower rollers and thence, to the angle members 26 with no load being transmitted either to the chains 15 or the drive 16.

Since the followers and trays are symmetrical, a load thereon creates no torque on the trays and no bending moments on the followers and thus, no lateral force in normal operation through the rollers 22 to the tracks. Furthermore, inasmuch as the guide tracks for the follower rollers do not cross each other at any point, in contradistinction to other elevators the four follower rollers 22 guiding each of my trays 20 are operatively effective at all times.

While the invention has been described and illustrated in its preferred embodiment, it should be understood that the invention is not to be limited to the precise details herein illustrated and described, since the same may be carried out in other ways falling within the scope of the following claims.

I claim:
1. In an elevator,
an endless chain;
a drive sprocket and an idler sprocket, each of the sprockets meshing with the chain and adapted to reverse the direction of travel thereof;
a symmetrical follower pivotally mounted at its center on the chain;
a pair of follower rollers symmetrically mounted on the follower, one roller of the pair being mounted at each end of the follower;
a symmetrical carrier tray carried by the follower, the center line of the tray being coincident with the center of the follower, the plane of the tray being perpendicular to the line joining the centers of the follower rollers; and
an endless guide track for guiding the rollers on the follower, the track comprising a single race adjacent one flight of the chain, a pair of parallel races adjacent the other flight of the chain, and a pair of outer cam tracks means for guiding the rollers adjacent the sprockets, the outer cam track means merging the single race and the parallel races along generally arcuate paths, the follower rollers being guided substantially vertically one above the other when they are in the single race, thereby to place the carrier tray in a horizontal load-carrying position when it is adjacent the one flight of the chain, the follower rollers being guided one in each of the parallel races with the line joining their centers being substantially horizontal, thereby to place the carrier tray in a generally vertical position when it is adjacent the other flight of the chain, the follower rollers passing from the single race to the parallel races and vice versa as they are guided by the outer cam track means, whereby the carrier tray is rotated ninety degrees as the follower is guided from the single race adjacent the one flight of the chain to the parallel races adjacent the other flight of the chain and vice versa.

2. The elevator of claim 1, further comprising a horizontally disposed cylindrical shaft;
   means to mount the follower at its center on one end of the shaft; and
   means to mount the carrier tray along its center line on the other end of the shaft;
   the shaft being journaled in one link of the chain.

3. The elevator of claim 2, in which the shaft is journaled in the one link intermediate the follower and the carrier tray, the one link comprising a bushing to receive the shaft.

4. The elevator of claim 3, further comprising means to prevent the carrier tray from rotating about its center line when the follower rollers are being guided one in each of the parallel races and the tray is in its generally vertical position.

5. The elevator of claim 4, in which the carrier tray rotation prevention means comprise:
   a pair of detents disposed within the one link, one each of the pair being disposed on each side of the center line of the shaft; and
   spring means urging the pair of detents toward the center line of the shaft;
   the shaft including notches on opposed sides thereof in the region of the pair of detents, the notches being adapted to receive the detents when the carrier tray is in the generally vertical position, the detents locking the shaft to the one link of the chain.

6. The elevator of claim 5, in which the detents comprise steel balls.

7. The elevator of claim 3, in which the drive and idler sprockets are notched to accommodate the one link of the chain.

8. The elevator of claim 1, in which the outer cam track means comprise cam plates, the cam plates being slotted to receive the follower rollers.

9. The elevator of claim 1 in which the follower comprises brake facing material on the side adjacent the guide track.

* * * * *